United States Patent [19]

Shimizu et al.

[11] 4,150,252
[45] Apr. 17, 1979

[54] V-SUSPENSION INSULATOR ASSEMBLIES FOR SUSPENDING MULTIPLE CONDUCTORS

[75] Inventors: Tsuneaki Shimizu, Chita; Yasuhiro Nakashima, Kakamigahara, both of Japan

[73] Assignee: NGK Insulators, Ltd., Nagoya, Japan

[21] Appl. No.: 864,490

[22] Filed: Dec. 27, 1977

[30] Foreign Application Priority Data

Dec. 27, 1976 [JP] Japan .................... 51-157813

[51] Int. Cl.² .................. H01B 17/10; H02G 7/00
[52] U.S. Cl. .................. 174/149 R; 174/150; 248/63
[58] Field of Search .......... 174/40 R, 43, 141 R, 174/148, 149 R, 150; 248/58, 61, 63, 64

[56] References Cited

U.S. PATENT DOCUMENTS

| | | | |
|---|---|---|---|
| 3,076,863 | 2/1963 | Lantz et al. | 174/149 R X |
| 3,076,864 | 2/1963 | Lantz et al. | 174/149 R X |
| 3,076,866 | 2/1963 | Lantz | 174/149 R |
| 3,240,870 | 3/1966 | Harmon | 174/149 R |
| 4,053,706 | 10/1977 | Houston et al. | 174/149 R |

FOREIGN PATENT DOCUMENTS 259218 5/1970 U.S.S.R. .................... 174/149 R

*Primary Examiner*—Laramie E. Askin
*Attorney, Agent, or Firm*—Jay L. Chaskin

[57] ABSTRACT

A V-suspension insulator assembly for suspending multiple conductors is disclosed, in which an angle of intersection of axial lines of connecting hardwares for connecting an inverted-U shape upper yoke to which V-suspension insulator strings for suspending multiple conductors are attached and a lower yoke which extends between opposite legs of the upper yoke is selected to be equal to or larger than an angle of intersection of axial lines of the insulator strings; and the intersecting point of the axial lines of the connecting hardwares is positioned near a center of gravity of a polygon defined by connecting points at which suspension clamps are attached to the lower yoke. With this construction, the movement and rotation of the lower yoke by load by wind pressure in a direction transverse to the conductors can be prevented and a space between the conductors can be reduced while preventing the mutual contact of the conductors and the twist of the conductor bundle.

7 Claims, 6 Drawing Figures

V-SUSPENSION INSULATOR ASSEMBLIES FOR SUSPENDING MULTIPLE CONDUCTORS

FIELD OF THE INVENTION

The present invention relates to a V-suspension insulator assembly for suspending multiple conductors.

DESCRIPTION OF THE PRIOR ART

With the recent rapid increase in demand for electric power in cities, an increase in the capacity for power transmission has been required. However, further new construction of power transmission lines is becoming more and more difficult in view of preservation of the environment, the high price of land and the influence on local society. Accordingly, the construction of large capacity power transmission lines is being planned, in which a prior art 500 kV, four-conductor bundled aerial power transmission line is being replaced by a six-conductor bundled power transmission line or even a 1000 kV, eight-or more conductor bundled power transmission line. However, where the number of bundle conductors of the power transmission line is six or more, a yoke body of a V-suspension insulator assembly must be very large in size and various problems are raised in manufacture, transportation and strength. A V-suspension insulator assembly for suspending eight conductors, as shown in FIG. 1, has been known, wherein a yoke body is divided into two yoke plates to overcome the above drawbacks and the upper yoke plate 1 and the lower yoke plate 2, each having four suspension clamps 8 coupled at the lower ends thereof through suspension hardwares or suspension members 7, are coupled together by two connecting hardwares 3, and an upper portion of the upper yoke 1 is connected to the ends of two insulator strings 9 which are suspended from an arm of a construction. In such a V-suspension insulator assembly for suspending eight conductors, since the connecting hardwares or connecting members 3 for connecting the upper yoke 1 and the lower yoke 2 are sandwiched by the suspension clamps 8 which are attached to the upper yoke 1, the space between the suspension clamps 8 and hence the space between the conductors must be large enough to prevent the contact of the suspension clamps 8 and the connecting hardwares 3 which might be caused by lateral vibration of the suspension clamps 8 due to the vibration of the conductors. Furthermore, if a load by wind pressure acting in a direction transverse to the conductors, as shown by an arrow, is large, the lower yoke 2 will be moved in a direction transverse to the conductors, as shown by a chain line, to change an array of the conductors. As a result, the deformation or break of spacers which are attached to the conductors in order to prevent the mutual contacting of the conductors or the twisting of the conductor bundle occurs or breakdown of some of element wires, which constitute the conductor, occurs.

SUMMARY OF THE INVENTION

It is an object of the present invention to provide a V-suspension insulator assembly for suspending multiple conductors which is free from the drawbacks of the prior art assembly described above.

The present invention provides a V-suspension insulator assembly for suspending multiple conductors in which the space between the suspension clamps for supporting the conductors can be reduced while preventing the contacting of the suspension clamps by lateral vibration.

The present invention also provides a V-suspension insulator assembly for suspending multiple conductors in which the movement and the rotation of the lower yoke by a load due to wind pressure which may create mutual contact of the conductors or the twist of the conductor bundle are prevented.

The above and other objects, features and advantages of the present invention will be apparent from the following description of the preferred embodiment of the invention when taken in conjunction with the accompanying drawings.

DETAILED DESCRIPTION OF THE PREFERRED EMBODIMENTS

Figure 1:
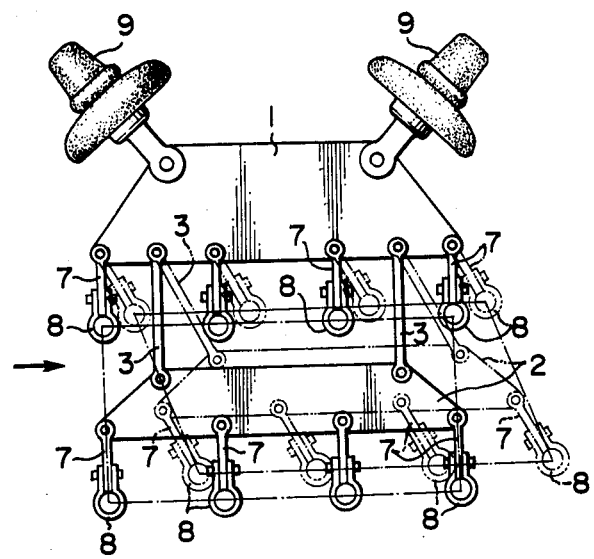
FIG. 1 shows a front view of an example of a prior art V-suspension insulator assembly for suspending multiple conductors.
Figure 2:
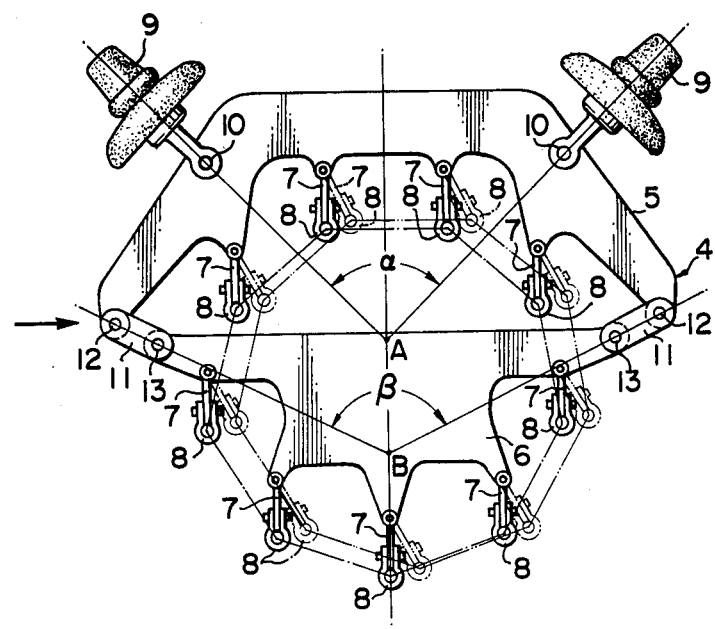
FIG. 2 shows a front view of one embodiment of the present invention.

Referring to FIG. 2 which shows one embodiment of the present invention and in which like numerals show like parts to those of FIG. 1, numeral 4 denotes a yoke body of a V-suspension insulator assembly for suspending nine conductors. The yoke 4 is divided into an upper yoke 5 and a lower yoke 6; and connecting points 12 at opposite ends of the upper yoke 5 and connecting points 13 at opposite ends of the lower yoke 6 are connected together by connecting hardwares or connecting members 11. Four suspension clamps 8 are suspended, at a predetermined interval, from an inner edge of the upper yoke 5 through four suspension hardwares 7 while five suspension clamps 8 are suspended, at a predetermined interval, from an outer lower edge of the lower yoke 6 through five suspension hardwares 7. The upper yoke 5 is of an inverted-U shape and is coupled at opposite upper ends thereof to the ends of a pair of insulator strings 9 which are suspended from an arm of a construction, not shown, by connecting members 10. The pair of insulators 9 are arranged such that extended lines of axial lines thereof intersect at a point A with V-angle $\alpha$. Furthermore, the intersecting point A is positioned near a center of gravity of a polygon which is defined by points at which the suspension clamps 8 are attached to the yoke body 4 to keep the balance of a combined load of a vertical load such as weight of the conductors applied to the yoke 4 and a load due to wind pressure on the conductors, for preventing the rotation or swinging of the yoke body 4 comprising the upper yoke 5 and the lower yoke 6 when the load due to wind pressure is applied in a direction transverse to the conductors. The connecting hardwares 11 are arranged such that extended lines of axial lines thereof passing through the connecting point 12 of the upper yoke 5 and the connecting point 13 of the lower yoke 6 intersect at a point B with V-angle $\beta$, which is equal to or larger than the V-angle $\alpha$ defined by the pair of insulator strings 9 in order to prevent the movement of the lower yoke 6 before the upper yoke 5 is rotated relative to the insulator strings 9 when the load due to wind pressure acts in a direction transverse to the conductors. Furthermore, the intersecting point B is positioned near the center of gravity of the polygon defined by the points at which the suspension clamps 8 are attached to the lower yoke 6 to keep the balance of a combined load by the vertical load such as the weight of conductors applied to the lower yoke 6 which is coupled to the upper yoke 5 and the load due to the wind pressure, for preventing the rotation of the lower yoke 6 when the load due to wind pressure is applied in a direction transverse to the conductors, similar to the intersecting point A of the insulator strings 9. The connecting points 12 of the upper yokes 5 are arranged at positions which prevent the contact of the suspension clamps 8 attached on the inner end of the upper yoke when the suspension clamps 8 are swung laterally, as shown by a chain line, by the load due to wind pressure in a direction transverse to the conductors. Further, the mounting portions of the suspension clamps 8 are so shaped that they are prevented from coming in contact with the yoke body 4 when the connected suspension clamps 8 swing laterally.

Figure 4:
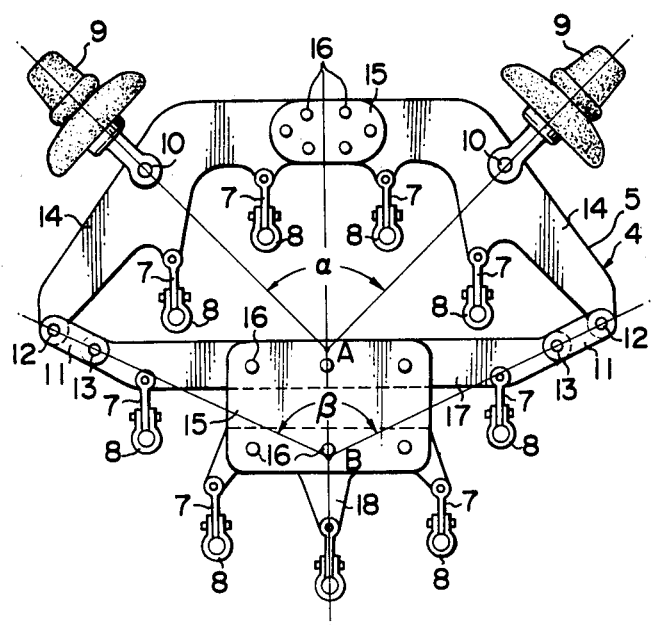
FIGS. 4, 5 and 6 show front views of other embodiments of the present invention.
Figure 5:
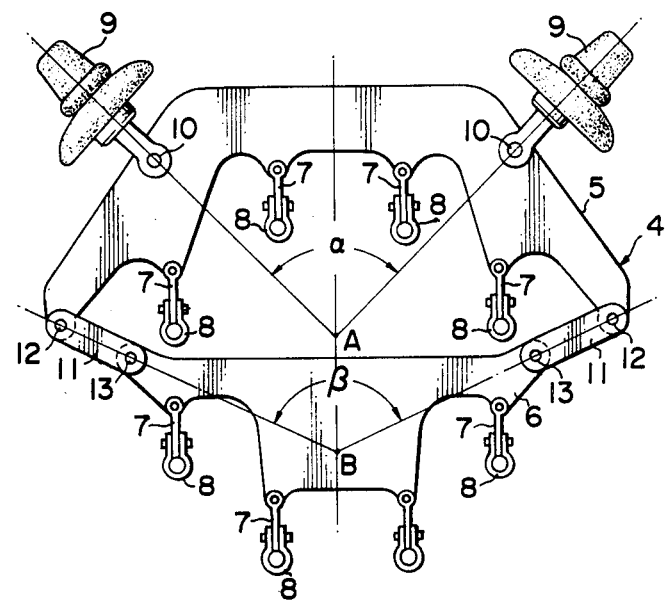

In an embodiment shown in FIG. 4, the upper yoke and the lower yoke which form the yoke body 4 are further divided for manufacturing and transportation reasons. Namely, the upper yoke is divided into two yoke pieces 14 and the lower yoke is divided into yoke pieces 17 and 18 and they are coupled together by connecting plates 15 and bolts 16. The number of divisions of each of the yokes and the connecting mechanism of the divided yoke pieces are not restrictive. Furthermore, as shown in FIG. 5, the present invention may be applied to an eight-conductor bundled suspension insulator assembly in which four suspension clamps 8 are attached to each of the upper yoke 5 and the lower yoke 6. The number of conductors is not restricted.

Figure 6:
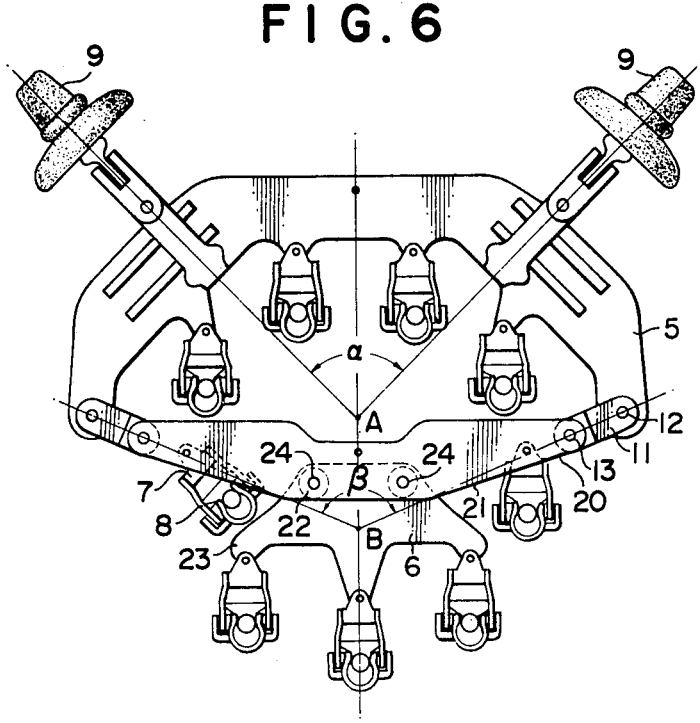

FIG. 6 shows an embodiment of the present invention, where the space between the conductors is limited. In order to prevent contacting of the suspension clamps 8 attached to the lower yoke with the lower yoke by lateral swing of the suspension clamps, the lower yoke is divided into a lapped yoke 21 of a pair of yoke plate pieces 20 and a yoke piece 23 which has washers 22 which separate the yoke plate pieces 20 at a predetermined space from each other. The lapped yoke 21 and the yoke piece 23 are coupled by bolts 24 such that when the suspension clamps 8 which are suspended by the suspension hardwares 7 at opposite ends of the lapped yoke 21 swing laterally toward the yoke body, the suspension hardwares 7 and the upper portion of the suspension clamps 8 move into the gap of the lapped yoke 21.

Figure 3:
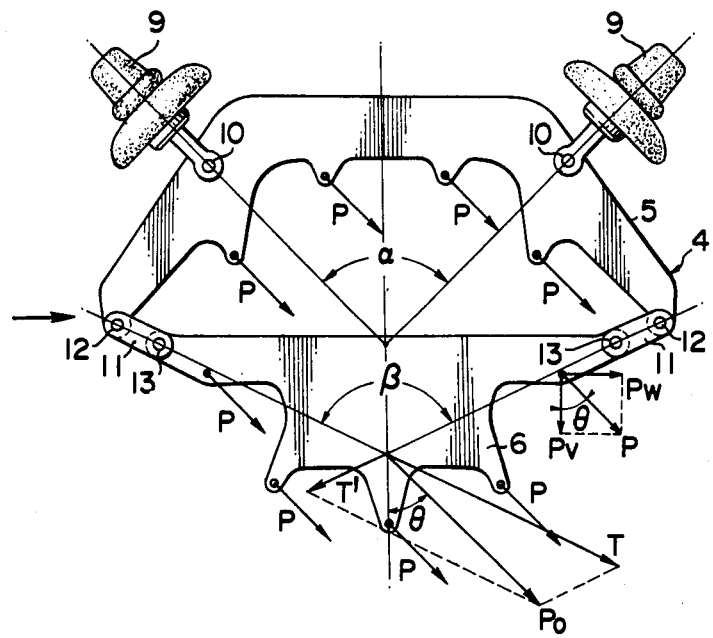
FIG. 3 illustrates a load condition in the embodiment of FIG. 2.

In each of the embodiments described above, since the V-angle $\beta$ defined by the intersection of the axial lines connecting the connecting point 12 of the upper yoke 5 and the connecting point 13 of the lower yoke 6 of the connecting hardware 11 is equal to or larger than the V-angle $\alpha$ defined by the pair of insulator strings 9, even if the acting angle $\theta$ of the combined load P of the vertical load $P_V$ such as the weight of the conductors and the load $P_W$ due to the wind pressure on the conductors which act on the attachment points of the suspension clamps 8 of the upper yoke 5 and the lower yoke 6 is equal to the angle of inclination of one of the insulator strings 9, that is, one half of the V-angle $\alpha$ defined by the intersection of the axial lines of the pair of insulator strings 9, which is the severest load condition to the V-suspension insulator assembly, as shown in FIG. 3, the loads (T, T') acting on each of the connecting hardwares 11 are tensile loads as seen from a vector diagram of the forces in which $P_O$ represents a sum of the combined loads P which act on the attachment points of the suspension clamps 8 of the lower yoke 6. Accordingly, the connecting hardwares 11 on the lee are not slackened and the lower yoke 6 is not moved in the direction transverse to the conductors before the upper yoke 5 is rotated and swung. Thus, in spite of the fact that the yoke 4 is divided, an effect similar to that attained by an integral type yoke is obtained, that is, as shown in FIG. 2 by chain line, only the suspension clamps 8 swing laterally to prevent the change of array shape defined by the conductors. The object of the present invention can be attained even when the V-angle $\beta$ defined by the connecting hardwares 11 is substantially equal to the V-angle $\alpha$ defined by the pair of insulator strings 9 by some reason of the design of the insulator assembly. In this case, if the acting angle $\theta$ of the combined load P exceeds one half of the V-angle $\beta$ defined by the connecting hardwares 11, the connecting hardwares 11 on the lee are subjected to compression load so that the lower yoke 6 moves in the direction transverse to the conductors. Accordingly, the V-angle $\beta$ defined by the connecting hardwares 11, that is, the V-angle $\alpha$ defined by the pair of insulator strings 9 must be set to be larger than twice of the possible acting angle $\theta$ of the combined load P.

As is apparent from the description of the embodiments, the present invention can minimize the space between the conductors of the V-suspension insulator assembly for suspending multiple conductors and can prevent the change of array shape defined by the conductors caused due to wind pressure in a direction transverse to the conductors. Thus, the present invention greatly contributes to the development of the industry.

What is claimed is:

1. A V-suspension insulator assembly for suspending multiple conductors in which a yoke body is divided into a pair of upper and lower yokes which are coupled together by a pair of connecting hardwares, wherein a V-angle $\beta$ defined by the intersection of axial lines connecting a connecting point of said upper yoke and a connecting point of said lower yoke of each of said connecting hardwares is equal to or larger than a V-angle $\alpha$ defined by the intersection of axial lines of a pair of insulator strings connected to said upper yoke.

2. A V-shaped insulator assembly for suspending multiple conductors according to claim 1 wherein an intersecting point B of axial lines connecting a connecting point in said upper yoke and a connecting point in said lower yoke of each of said connecting hardwares which define said V-angle $\beta$, is positioned near a center of gravity of a polygon defined by connecting attached points of suspension clamps in said lower yoke.

3. A V-suspension insulator assembly for suspending multiple conductors according to claim 1 wherein each of said upper and lower yokes comprises a plurality of yoke pieces.

4. A V-suspension insulator assembly for suspending multiple conductors according to claim 1 wherein each of said upper and lower yokes supports suspension clamps.

5. A V-suspension insulator assembly for suspending multiple conductors according to claim 1 wherein each of said upper and lower yokes supports an equal number of suspension clamps.

6. A V-suspension insulator assembly for suspending multiple conductors according to claim 1 wherein each of said upper and lower yokes has clamp attached portions of a selected shape to prevent the contact with the yoke due to lateral swing of the suspension clamps.

7. A V-suspension insulator assembly for suspending multiple conductors according to claim 1 wherein said lower yoke comprises first lapped yoke pieces spaced at a predetermined gap therebetween to accommodate suspension clamps therein and a second yoke piece held in said gap.

* * * * *